Sept. 2, 1958         M. S. CLARK         2,850,297
QUICK DETACHABLE COUPLER
Filed Nov. 6, 1953                    2 Sheets-Sheet 1

INVENTOR.
MALCOLM S. CLARK
BY
Woodling and Krost
ATTYS.

Sept. 2, 1958      M. S. CLARK      2,850,297
QUICK DETACHABLE COUPLER
Filed Nov. 6, 1953      2 Sheets-Sheet 2

INVENTOR.
MALCOLM S. CLARK
BY
Woodling and Krost
ATTYS.

United States Patent Office 2,850,297
Patented Sept. 2, 1958

2,850,297

QUICK DETACHABLE COUPLER

Malcolm S. Clark, Union City, Pa., assignor to Snap-Tite, Inc.

Application November 6, 1953, Serial No. 390,594

3 Claims. (Cl. 284—18)

This invention relates to new and useful improvements in quick detachable pipe couplers and more particularly to the type including valve mechanism which automatically closes to prevent fluid flow therethrough when the two units of the coupler are disconnected, and which automatically opens as the units are connected to instantly establish fluid flow therethrough.

An important object of the invention is to provide an improved valve seat for the coupler which is located so as not to restrict the flow through the coupler when the valve mechanism is open; the valve body of this mechanism having its seating portion arranged at its outer end in such position as to move into an enlarged part of the bore when open to obtain maximum flow through the coupler.

Another object of the invention is to provide a valve body for the coupler which is provided with a large valve pressure head and improved sealing means carried thereby to effect an absolutely tight, long-life fluid pressure seal when the units are disconnected.

Another object of the invention is the provision of a valve construction for the coupler which facilitates fluid flow therethrough without tubulence or restriction when the valve is open, and which when closed and the coupler is disconnected, provides an absolutely tight, long-life fluid pressure seal.

Another object of the invention is the provision of sealing means for the coupler which are so constructed and located as to increase their lives and render them more easily accessible for assembly and/or replacement.

A still further object of the invention is to eliminate the use of all adaptors for the couplers and to provide a coupler with a male unit having a straight nipple in place of a tapered one, enabling it to be connected to and disconnected from the female unit easier and which enables the units to rotate more freely relatively because they are not wedged together with a tapered nipple.

A still further object of the invention is to provide an extremely simple and effective valve mechanism in the form of a valve insert unit which is interchangeable in the coupler units and can be installed therein or removed therefrom with minimum effort and expense.

Other objects and a fuller understanding of this invention may be had by referring to the following description and claims, taken in conjunction with the accompanying drawings, in which:

Figures 1, 2, 3, 4:
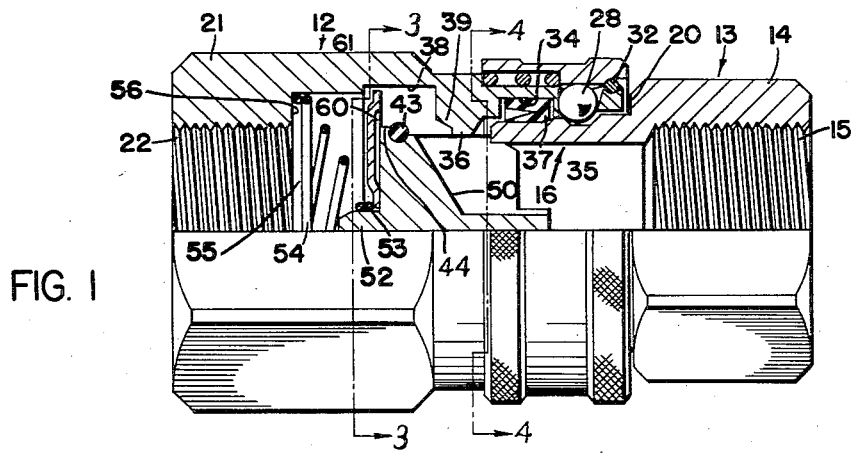
Figure 1 is a side elevation of the coupler shown with one-half in longitudinal section and with the two units in coupled or connected relationship.
Figure 2 is a similar view showing the two units disconnected.
Figure 3 is a transverse section taken on the line 3—3 of Figure 1.
Figure 4 is a transverse section taken on the line 4—4 of Figure 1.

Referring now more in detail to the drawings, the coupling is illustrated as composed of a hollow tubular female coupler unit or member 12 and a hollow tubular male nipple unit or member 13. This male unit has one end thereof provided with a polygonal wrench receiving head or end 14, having an interior female threaded portion 15 by which it can be threadedly connected with a pipe line or flexible hose, not shown. The other end of the male unit is provided with a cylindrical axially extending tubular nipple 16 integrally united to the head and is of slightly greater wall thickness from a point near its middle portion to the head than at its free end. The free end of the nipple is squared with its outer corner edge tapered to facilitate smooth entrance into the female unit. The outer periphery of this free end is perfectly cylindrical, as at 17. The thick walled inner portion of this nipple, at a distance from the head 14, is provided with an annular groove 18 having inwardly converging side walls 19 arranged at about forty-five degree angles. The enlarged diameter of a portion of the nipple and the groove 18 provides the male nipple with an annular external rib 19'. The head 14, being larger than the nipple 16, provides the male unit with an annular shoulder 20 which is so spaced from the groove 18 as to enable this shoulder to revolve clear of the female unit when assembled therewith to reduce friction and eliminate any hindrance to the free relative rotation of the two units.

The female coupler unit 12 is also provided with an enlarged polygonal wrench head 21 having an interior female threaded portion 22 of the same size as the male portion 15 to fit the same size pipes of an installation. The inner tubular end 23 of the female unit, which receives the male nipple, is integrally joined to the head 21 and has a stepped outer cylindrical surface 24 and 25 to provide a stop shoulder 26 therebetween. The outer smaller diameter end 23 near its free end is provided with an annular series of radial inwardly tapering openings 27 for the reception of a plurality of locking balls 28. The taper of these openings permits the balls to remove radially to lock and unlock with the groove 18 in the male unit, but prevents them from moving too far radially inwardly and falling out of place when the male unit is withdrawn from the female unit. As is well understood in the art, the balls 28 are pressed radially inward to lock in the groove 18 of the male unit by a locking sleeve 29 slidably and rotatably mounted on the reduced end 23 of the female unit. This sleeve has its inner periphery provided with an inwardly projecting wall portion 30 which engages and holds the balls pressed inwardly when the sleeve is slid outwardly along the surface 25, and which permits the balls to move laterally outwardly when the sleeve is slid inwardly toward the head 21 to release the balls from the groove 18. The locking sleeve is normally urged outwardly of the female unit to hold the balls in, by a compressible coiled spring 31 surrounding the surface 25 and abutting the shoulder 26 on the female unit and the shoulder of the sleeve next to the portion 30. This outward locking movement of the sleeve 29 is stopped by a stop ring 32 anchored in a groove in the end of the female unit to engage the outer shoulder formed by the surface 30. Inward unlocking movement of the sleeve 29 is restrained by compression of the spring 31, and such movement permits the balls to move outwardly as the enlarged overhanging lip 33 of the sleeve moves above the balls as they are cammed outwardly by the rib 19' of the male unit. When the sleeve 29 is in locked position, the lip 33 overhangs the stop ring 32 and protects it. As many tests were made of this coupler under hydraulic pressure for maximum operating pressures, it was found that by distributing the pressure over a greater number of balls 28, that much more uniform and higher operating pressures could be developed, so that in the larger size couplers, eight, ten or even more balls can be advantageously employed in a coupler. It was also found that if the angles of the walls 19 of the ball groove 18 are maintained around forty-five degrees, less brunneling occurs.

The inner surface of the tubular end 23 of the female coupler near the ball openings 27 has a ring seal groove 34 in a bore 35 which is of larger diameter than the bore 36. This bore 36 is the smallest bore in the female unit and is approximately the size of the pipe line in which the coupler is installed so as not to retard the flow of fluid through this line. A U-shaped rubber ring or gasket 37 is positioned in the groove 34 with one feathered lip or wall of the ring of tapered cross section projecting inwardly of the female coupler and into the bore 35 to engage the cylindrical surface 17 of the nipple and form a liquid-tight seal therewith when the male and female members are connected. In order to provide for unrestricted fluid flow through the female unit in spite of the provision of a self-closing valve mechanism therein, the bore through the female member between its threaded end 22 and the small portion 36 of the bore, is enlarged as at 38. The wall of the female member arranged between the two bores 36 and 38 is provided with a valve seat 39 arranged at approximately a thirty-degree angle to the axis of the female member. The smaller end of this tapered seat terminates in a shoulder 40 arranged normal to the axis of the female unit, and this shoulder is therefore normal to the smaller portion 36 of the bore. A valve body 41 is provided with a cylindrical head which is slidably received and supported by the small bore portion 36 of the female unit to cooperate with the seat 39. The periphery of the valve head is provided with an annular groove 42 to snugly receive an elastic rubber or rubber composition O-ring 43 having a normal circular cross section to cooperate with the seat 39. This O-ring is more effectively held in its groove by forming the outer end of the valve body 41 of larger diameter than the bore 36 so as to increase the height of one side of the groove 42, as indicated by the numeral 44. Thus, as best appreciated from Figure 8, when seating pressure is exerted on valve body 41 in the direction of the arrow, the O-ring 43 will be forcibly pressed against the seat 39 to flatten the elastic ring thereupon and to simultaneously distort it from its true circular cross section to tightly seal all surfaces between the valve body and its seat, while the approximate thirty-degree slope of the seat and the enlarged head 44 of the valve traps the O-ring 43 upon the seat.

Figure 9:
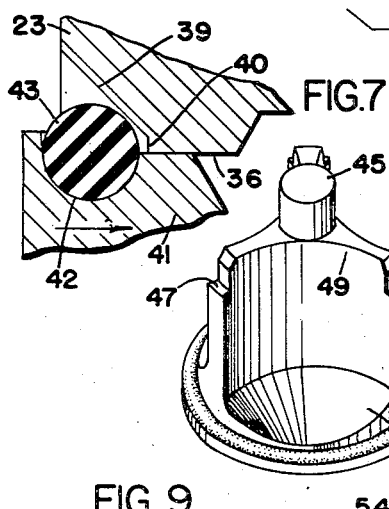
Figure 9 is a perspective view of one form of valve body employed with the invention.
Figure 10:
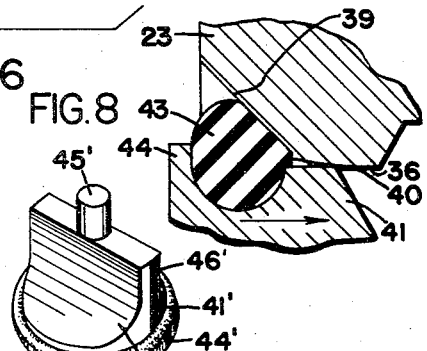
Figure 10 is a perspective view of another form of valve body.

The valve body 41 is adapted to be automatically moved off of the seat 39 by movement of the male nipple 16 into the female unit to connect the two units, and for this purpose the valve body is provided with an axially projecting stem 45 from which radiate a plurality of vanes 46 having the same radius of the valve body to slide upon the smaller bore 36 in the female member. The edge of each vane or flute 46 is provided with a shoulder 47 for contact with the free end of the male nipple 16 as the latter is inserted into the female unit. This contact and movement of the male nipple moves the valve body 41 off its seat 39 to establish flow of fluid through the coupler as the units are connected together. To obtain greater flow of fluid without turbulence, the valve is preferably provided with three vanes 46 arranged equidistant around the stem 45. This stem is made of small diameter so as not to decrease with flow of fluid through the coupling. Preferably, the valve body 41 is made of bar or round stock with the vanes formed by drilling this stock longitudinally in three planes and taking cuts lengthwise in the stock of about one-third of the diameter of the drill on center lines located about as shown at 48 in Figure 4. This provides the vanes with adjacent arcuate merging sides 49 and provides the body of the valve, where the vanes merge therewith, with about a thirty-degree inclined surface 50 to facilitate the flow of fluid past the valve. In Figure 10, a modified valve body 41', corresponding to the body 41 shown in Figure 9, is shown as being provided with a single diametrically extending vane 46' having opposite faces inclined, as at 51, to merge into the valve body. Various shapes and forms of valve bodies may be employed, but the form shown in Figure 9 has been found to afford greater flow of fluid through the coupling.

Figure 11:
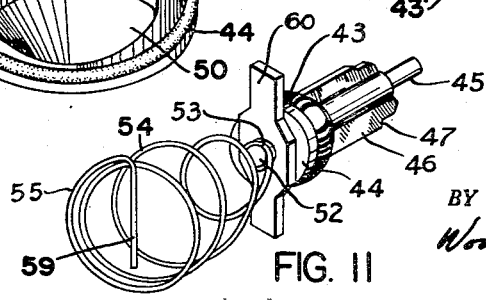
Figure 11 is a perspective view of a modification of the valve mechanism or insert prior to assembly in the coupler.

The opposite side of the valve body is provided with an axially projecting button or projection 52 which receives the smaller coils 53 of a conical compression spring 54 having its larger end convolutions 55 adapted to bear against the shoulder 56 formed in the female unit by the enlargement of the bore to a point almost as large as the enlargement 38 thereof. Such two enlargements 38 and 57 form an annular shoulder 58. As best seen in Figure 11, the enlarged end of the conical spring 54 terminates in a free end 59 which extends approximately diametrically of the spring 54 and is utilized as a single finger grip to assemble the valve insert in the female unit. This spring normally urges the valve body 41 with its O-ring against the seat 39 to hold the valve in closed position when the two units of the coupler are disconnected to thereby cut off any flow of fluid from the female unit.

To provide guide means for accurately guiding the valve body to and from its seat without retarding the flow of fluid through the coupler, a two-armed spider guide plate 60 is provided with a central aperture for the reception of the valve button 52. This spider guide operates in the enlarged chamber or bore portion 38 of the female unit and has only slight clearance with the walls thereof. To increase its rigidity, this spider guide is blanked from flat stock and has each arm provided with a longitudinally extending depression forming reinforcing ribs 61, as best seen in Figure 3. From the foregoing, it will be obvious that the valve, its spider guide and its activating spring can be assembled as a unit or valve insert by slipping the spider guide over the button 52 of the valve body, after which the smaller end of the conical spring 54 is slipped upon this button in frictional contact therewith, in order that the valve body and spider may be held by the end 59 of the spring and inserted through the threaded end 22 of the female unit to assemble it therewith. Thus, after the larger end of the coil spring has been inserted far enough into the female unit to cause the large convolutions 55 to abut against the shoulder 56, the valve body 41 with its O-ring will be pressed against the seat 39 to normally cut off flow of fluid therethrough. However, when the male member 16 is inserted into the female unit, the squared end of the nipple will engage the shoulders 47 of the valve body vanes 46 and force the valve body 41 off of its seat 39 against the tension of the conical spring 54. When the valve body is in such open position and its area being much smaller than the area of the enlarged bore 38, a wide open passage entirely around the valve body will be opened for the free flow of fluid through the coupling. In assembling, the male unit with the female unit, the locking sleeve 29 is slid toward the enlarged head of the female member compressing the spring 31 which will allow the cam surface 30 of the locking sleeve to relieve pressure upon the locking balls 28 in order that they may move outwardly as the rib 19' of the male member moves past the balls to a coupled position. Thereafter, pressure upon the locking sleeve 29 is released to permit the spring 31 to move the sleeve outwardly thereby forcing the locking balls inwardly into the groove 18 of the male nipple to detachably interlock the two units.

Figure 5:
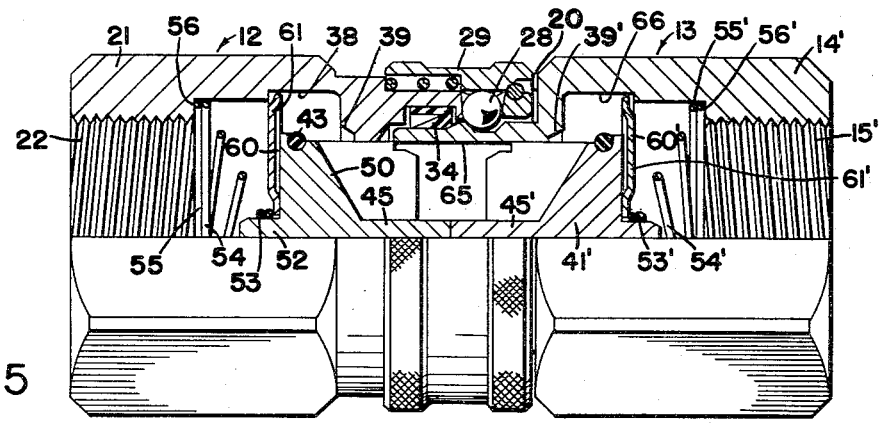
Figure 5 is a side elevation of the coupler with one-half thereof shown in longitudinal section and with both the male and female units containing separate valve mechanisms.
Figures 6, 7, 8:
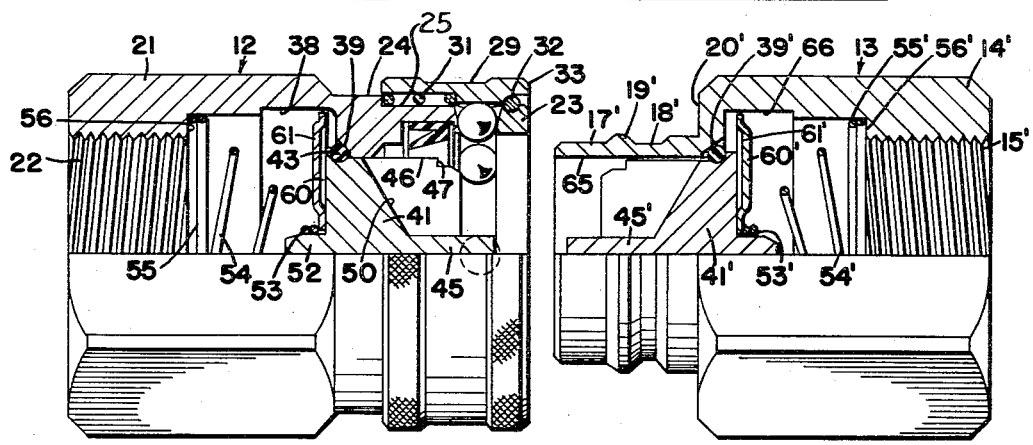
Figure 6 is a similar view of the coupler illustrating the two units disconnected.
Figure 7 is an enlarged sectional view of part of the valve mechanism for any of the various embodiments illustrating the cross-sectional shape of the sealing means prior to engagement with the valve seat.
Figure 8 is a similar view of the sealing means illustrating its cross-sectional shape under valve closing pressure.

In Figures 1 and 2, the male unit 13 is in the form of a plain nipple without the inclusion of a valve mechanism; but when it is desired to cut off any flow of fluid from the male unit or prevent the entrance of foreign matter, when it is disconnected from the female unit, a valve mechanism may be included in the male unit. Such a conversion is shown in Figures 5 and 6, and the parts of this modified male unit corresponding to those of the male units shown in Figures 1 and 2 are designated with corresponding numerals with a prime coefficient added thereto. In order to incorporate a valve mechanism in a male unit, the polygonal head portion 14' thereof is constructed of larger diameter in order that the bore 65 through the nipple can be enlarged in the head as at 66 to permit greater freedom of fluid flow through the male member and around the valve mechanism positioned therein. The juncture portion between the bores 65 and 66 in this male member is provided with an approximate thirty-degree valve seat 39' corresponding to the seat 39 in the female member. Thus, the male unit is provided with a construction making it possible to utilize identically the same valve mechanism as is employed in the female unit. Valve parts of the male unit which correspond with valve parts of the female unit are given the same numerals with a prime coefficient added thereto. These valve units being interchangeable in the male and female units makes for economy in the manufacture thereof. Their operation is identical except that the valve mechanism in the male unit is opened when the units are coupled by the abutment of the two valve stems 45 and 45', which are of such length that when the units are coupled, the valves in both the male and female members are simultaneously opened. Conversely, when the two units are disconnected and the valve stems are disengaged, the two valve bodies are immediately forced to the seats in the respective units to cut off the flow of fluid from either unit and to protect the insides of the units against the entrance of foreign matter.

From the foregoing description, it will be observed that the coupler is constructed to insure maximum fluid flow therethrough, due to the smallest bore through the coupler units being approximately the same size as the pipe line in which it is installed. In addition, the valve seats and valves are approximately of this same size and the larger ends of the valves operate in the enlarged portions of the bores. Although the valves slide in the smallest bores in their respective units, they are so formed and with special flutes to allow maximum flow without turbulence of the fluid when in open positions. Since the bores 33 and 66 of the units are enlarged to approximately equal the area of the piping when the valves are open, there will be no restriction of the flow through the coupler by the valve mechanisms, and yet the larger ends of the valves present sufficient pressure area to be assisted in closing by fluid pressure present in the coupler when the units are disconnected. The springs are so tensioned as to close their respective valves when the units are disconnected, irrespective of the direction of fluid flow through the coupler.

The larger ends of the valves are provided with the sealing O-rings which will be normally forced upon their inclined valve seats by the springs when the units are disconnected. This spring pressure is sufficient to distort the O-rings out of their normal circular cross section to flatten against their seats and to be distorted to completely fill the spaces and crevices between the adjacent surfaces of the units, as well as to trap the rings between the seats and the larger ends of the valves. Thus, a more effective seal is provided for the units when they are disconnected; and due to the flexing of the rings against their seats and their elastic recovery when unseated, their lives are prolonged. When the units are connected, the coupler is sealed against leakage by the U-shaped sealing rings which have their lips flexed against the mating units by fluid pressure within the coupler and pipe line. However, in this coupled position, the units are free to rotate relatively because the enlarged end of the male unit is spaced from the female unit; and when the latter is held stationary and the male unit is rotated, the nipple of this male unit will rotate upon the U-shaped sealing ring. As it does so, with the nipple pressing the valve off of its seat, the rotation of this nipple will cause the valve to rotate with it to change the position of the O-ring relative to its seat and thereby present different portions of its periphery to the seat. As the valve is rotated by turning the male unit, the spring mounting button of the valve will rotate freely within the smaller convolutions of the spring, carrying with it the guide spider. However, when the male unit is held stationary, and the female unit is rotated relative thereto, the valve will remain stationary and the spring will be rotated with the female unit, with the smaller convolutions of the spring rotating freely about the valve button.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A coupler unit comprising a member having a fluid passage extending through and including adjacent large and small diameter bores separated by an annular inclined valve seat having its wall converging inwardly from said large diameter bore toward said smaller diameter bore and terminating in a flat annular shoulder normal to said bores, a valve body fitting and movable axially in said smaller bore and having a flange portion of larger diameter than said smaller bore disposed in said large bore and arranged in opposed relation to said annular shoulder, said valve body having a peripheral groove beside said flange portion, an elastic ring of generally circular cross section retained in said peripheral groove adjacent said flange portion and adapted to be pressed against said converging wall of said seat to flatten a portion of the circular section of said ring and to deform portions thereof out of said normal circular cross sectional shape along said converging wall and against said flat annular shoulder, said valve body having an axially projecting button in said large diameter bore, a two-armed spider guide plate having wall means defining a central aperture, said wall means of said central aperture surrounding said axially projecting button of said valve body, a conical compression spring having small end convolutions and having large end convolutions, said small end convolutions of said conical spring residing on said axially projecting button of said valve body to hold said spider guide plate on said axially projecting button, said large end convolutions of said spring engaging wall means in said large diameter bore of said member to exert a force on said valve body tending to close the same, said large end convolutions terminating in a free end extending diametrically of said spring to act as a finger grip for assembling said spring with said coupler unit.

2. A coupler unit comprising a member having a fluid passage extending through and including adjacent large and small diameter bores separated by an annular inclined valve seat having its wall converging inwardly from said large diameter bore toward said smaller diameter bore and terminating in a flat annular shoulder normal to said bores, a valve body fitting and movable axially in said smaller bore and having a flange portion of larger diameter than said smaller bore disposed in said large bore and arranged in opposed relation to said annular shoulder, said valve body having a peripheral groove beside said flange portion, an elastic ring of generally circular cross section retained in said peripheral groove and adapted to be pressed against said converging wall of said seat to flatten a portion of the circular section of said ring and to deform portions thereof out of said normal circular cross sectional shape along said converging wall and against said flat annular shoulder, said valve body having an axially projecting button in said large diameter bore, a spider guide plate having wall means defining an aperture, said wall means of said aperture surrounding said axially projecting button of said valve body, a conical compression spring having small end convolutions and having large end convolutions, said small end convolutions of said conical spring residing on said axially projecting button of said valve body to hold said spider guide plate on said axially projecting button, said large end convolutions of said spring engaging wall means in said large diameter bore of said member to exert a force on said valve body tending to close the same.

3. A coupler unit comprising a member having a fluid passage extending through and including adjacent large and small diameter bores separated by an annular inclined valve seat having its wall converging inwardly from said large diameter bore toward said smaller diameter bore and terminating in an annular shoulder generally transverse to said bores, a valve body movable axially in said smaller bore and having a flange portion of larger diameter than said smaller bore disposed in said large bore and arranged in opposed relation to said annular shoulder, said valve body having a peripheral groove beside said flange portion, a deformable ring of generally annular cross section retained in said peripheral groove and adapted to be pressed against said converging wall of said seat to flatten a portion of the annular section of said ring and to deform portions thereof out of its normal cross sectional shape along said converging wall and against said annular shoulder, said valve body having an axial projection in said large diameter bore, a spider guide plate carried by said axial projection of said valve body, a compression spring having small end convolutions and having large end convolutions, said small end convolutions of said spring carried by said axial projection, said large end convolutions of said spring engaging wall means in said large diameter bore of said member to exert a force on said valve body tending to close the same.

References Cited in the file of this patent

UNITED STATES PATENTS

| Number | Name | Date |
|---|---|---|
| 80,066 | Gibson | July 21, 1868 |
| 1,226,870 | Duryea | May 22, 1917 |
| 1,654,772 | Akeyson et al. | Jan. 3, 1928 |
| 1,796,252 | Greve | Mar. 10, 1931 |
| 2,377,812 | Scheiwer | June 5, 1945 |
| 2,394,236 | Eastman | Feb. 5, 1946 |
| 2,425,500 | Wiggins | Aug. 12, 1947 |
| 2,428,638 | Scheiwer | Oct. 7, 1947 |
| 2,459,477 | Van Schuyver | Jan. 18, 1949 |
| 2,461,705 | Stranberg | Feb. 15, 1949 |
| 2,504,569 | Murphy et al. | Apr. 18, 1950 |
| 2,512,999 | Bruning | June 27, 1950 |
| 2,548,528 | Hansen | Apr. 10, 1951 |
| 2,642,297 | Hanna | June 16, 1953 |
| 2,665,928 | Omon et al. | Jan. 12, 1954 |